(12) United States Patent
Bowles

(10) Patent No.: US 9,146,584 B2
(45) Date of Patent: Sep. 29, 2015

(54) ELECTRONIC TABLET MOUNTING APPARATUS

(71) Applicant: Lowell Bowles, Banning, CA (US)

(72) Inventor: Lowell Bowles, Banning, CA (US)

(*) Notice: Subject to any disclaimer, the term of this patent is extended or adjusted under 35 U.S.C. 154(b) by 230 days.

(21) Appl. No.: 13/924,385

(22) Filed: Jun. 21, 2013

(65) Prior Publication Data

US 2014/0001324 A1    Jan. 2, 2014

Related U.S. Application Data

(60) Provisional application No. 61/666,700, filed on Jun. 29, 2012.

(51) Int. Cl.
| | |
|---|---|
| *F16B 1/00* | (2006.01) |
| *G06F 1/16* | (2006.01) |
| *F16M 11/04* | (2006.01) |
| *F16M 13/00* | (2006.01) |
| *F16M 13/02* | (2006.01) |

(52) U.S. Cl.
CPC .............. *G06F 1/1613* (2013.01); *F16M 11/04* (2013.01); *F16M 11/041* (2013.01); *F16M 13/00* (2013.01); *F16M 13/02* (2013.01)

(58) Field of Classification Search
CPC .... G06F 1/1613; F16M 11/041; F16M 11/04; F16M 13/00; F16M 13/02
USPC ............. 248/229.1, 441.1, 447.1, 447.2, 451, 248/452, 453, 176.1, 177.1, 121; 108/44; 348/157; 396/419
See application file for complete search history.

(56) References Cited

U.S. PATENT DOCUMENTS

| | | | |
|---|---|---|---|
| 5,100,098 A |  | 3/1992 | Hawkins et al. |
| 5,673,628 A | * | 10/1997 | Boos ................................ 108/44 |
| 5,751,548 A | * | 5/1998 | Hall et al. ................ 361/679.41 |
| 6,113,050 A |  | 9/2000 | Rush |
| 6,604,720 B1 | * | 8/2003 | Wilson ....................... 248/177.1 |
| 7,513,470 B2 |  | 4/2009 | Lomberk et al. |
| 7,551,458 B2 | * | 6/2009 | Carnevali ...................... 361/807 |
| 7,694,923 B2 |  | 4/2010 | Joy et al. |
| 7,744,048 B1 | * | 6/2010 | McKellery et al. ........ 248/177.1 |
| 7,984,886 B2 | * | 7/2011 | Lin ............................ 248/181.1 |
| 8,007,188 B2 |  | 8/2011 | Orf |

(Continued)

FOREIGN PATENT DOCUMENTS

| | | |
|---|---|---|
| CN | 202691488 U | 1/2013 |
| JP | 2011028197 A | 10/2011 |

(Continued)

*Primary Examiner* — Anita M King
(74) *Attorney, Agent, or Firm* — Cotman IP Law Group, PLC

(57) ABSTRACT

The electronic tablet mounting apparatus described herein comprises a frame with a plurality of clamps and support elements in the back panel of the frame. The frame is preferably substantially rectangular to conform to the footprint of the tablet computer. The clamps and support elements are configured to removably engage a backside of a tablet computer and to securely hold the tablet computer in place on the back panel without obscuring functional elements on the backside of the tablet computer. The apparatus further comprises a mounting bracket configured as an L-shaped flange. The mounting bracket is fixedly coupled to the bottom-side of the frame. The bracket is further configured to removably couple to a tripod head or any portable stand suitable for stabilizing a tablet or similar device for a particular task, e.g. photography.

20 Claims, 3 Drawing Sheets

(56) References Cited

U.S. PATENT DOCUMENTS

| | | |
|---|---|---|
| 8,020,816 B2 * | 9/2011 | Laitila et al. ............... 248/125.7 |
| 8,807,849 B2 * | 8/2014 | Apter ............................ 396/419 |
| 2001/0011819 A1 * | 8/2001 | Tao ................................ 281/45 |
| 2004/0007651 A1 * | 1/2004 | Williams et al. ......... 248/346.06 |
| 2006/0226309 A1 * | 10/2006 | Pao ........................... 248/122.1 |
| 2007/0131825 A1 | 6/2007 | Skrodzki et al. |
| 2009/0090839 A1 * | 4/2009 | Lin .............................. 248/676 |
| 2012/0187257 A1 | 7/2012 | Zou |
| 2012/0270599 A1 * | 10/2012 | Mori et al. ................. 455/556.1 |
| 2013/0009032 A1 | 1/2013 | Polletta et al. |
| 2013/0293719 A1 * | 11/2013 | Ashe ............................ 348/157 |

FOREIGN PATENT DOCUMENTS

| | | |
|---|---|---|
| KR | 20060035830 | 4/2006 |
| KR | 20110008065 | 8/2011 |
| TW | M438794 U2 | 10/2012 |

* cited by examiner

ELECTRONIC TABLET MOUNTING APPARATUS

CROSS-REFERENCE TO RELATED APPLICATIONS

The present application claims the benefit of U.S. Provisional Application Ser. No. 61/666,700, filed on Jun. 29, 2012, the specification of which is herein incorporated by reference for completeness of disclosure.

BACKGROUND OF THE INVENTION

1. Field of the Invention

The present invention generally relates to a mounting device, and more particularly to a device for attaching an electronic tablet to a portable mounting point.

2. Description of the Related Art

Digital cameras have long surpassed traditional film cameras in popularity due to the combination of convenience, cost, and photo quality. Digital cameras themselves have recently evolved from standalone camera devices to multipurpose mobile devices, such as tablet computers and mobile phones, featuring integrated digital camera functionality. These multipurpose mobile devices make further improvements on user convenience but often lack the photo quality that standalone camera devices offer.

One obstacle preventing multipurpose mobile devices from obtaining higher photo quality is the lack of a convenient method of stabilizing the device in the picture taking process. Standalone digital cameras are often used with a standard camera tripod for stabilization. However, most standard camera tripods are incompatible with multipurpose mobile devices. Accordingly, there is a need for a device for use in stabilizing multipurpose mobile devices such as tablets and smart phones for the picture taking process.

BRIEF SUMMARY OF THE INVENTION

One or more embodiments of the invention disclose a mounting apparatus for attaching an electronic tablet to a portable camera stand, e.g. a tripod. The apparatus comprises a frame with a plurality of clamps and support elements in the back panel of the frame. The frame is preferably substantially rectangular to conform to the footprint of the tablet computer. The frame may be configured to be adjustable or sized for the target tablet computer. Through the front side of the frame, access is provided for the functional controls and display of the tablet computer. The front panel of the frame may include protective devices, e.g. screen protectors, for the display screen of the tablet computer.

In one or more embodiments of the present invention the clamps and support elements are configured to removably engage a backside of a tablet computer and to securely hold the tablet computer in place on the back panel without obscuring functional elements on the backside of the tablet computer. When the tablet computer is mounted on the frame, the front face of the tablet computer abuts the back panel of the frame and the clamps act to sandwich the tablet to the frame.

In one or more embodiments of the present invention the apparatus further comprises a mounting bracket configured as an L-shaped flange. The mounting bracket is fixedly coupled to the bottom-side of the rectangular frame. The bracket is further configured to removably couple to a tripod head, for example. The bracket may also be configured to mount the apparatus to any portable stand suitable for stabilizing a tablet or similar device for a particular task, e.g. photography, videography, etc.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

An apparatus for mounting an electronic tablet or similar device to a portable stabilizing structure will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Figure 1:
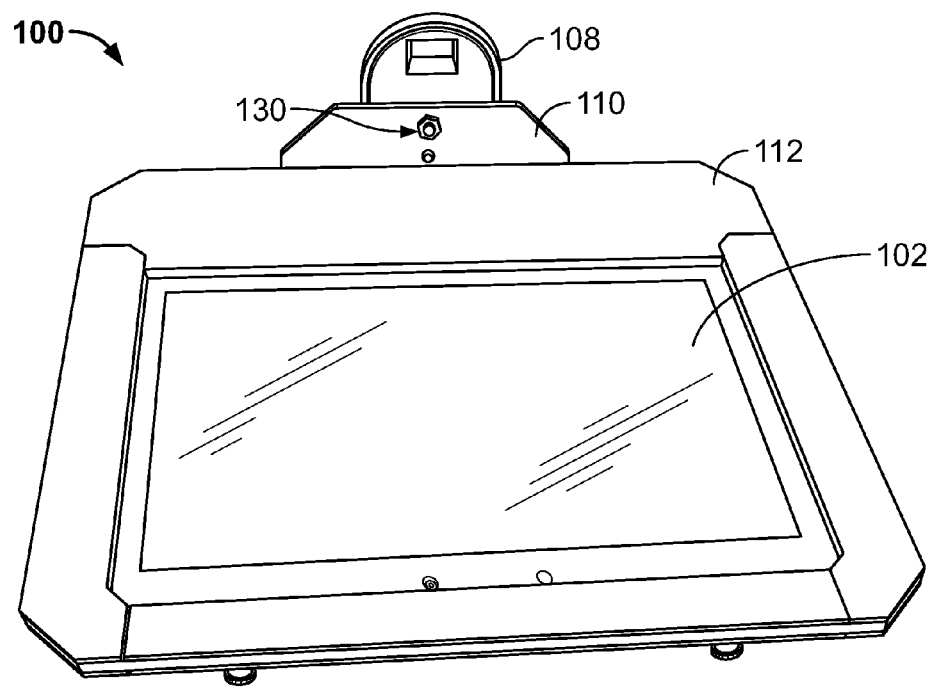
FIG. 1 is an illustration of the frontal view of a mounting apparatus with a tablet coupled therein in accordance with one or more embodiments of the present invention.
Figure 2:
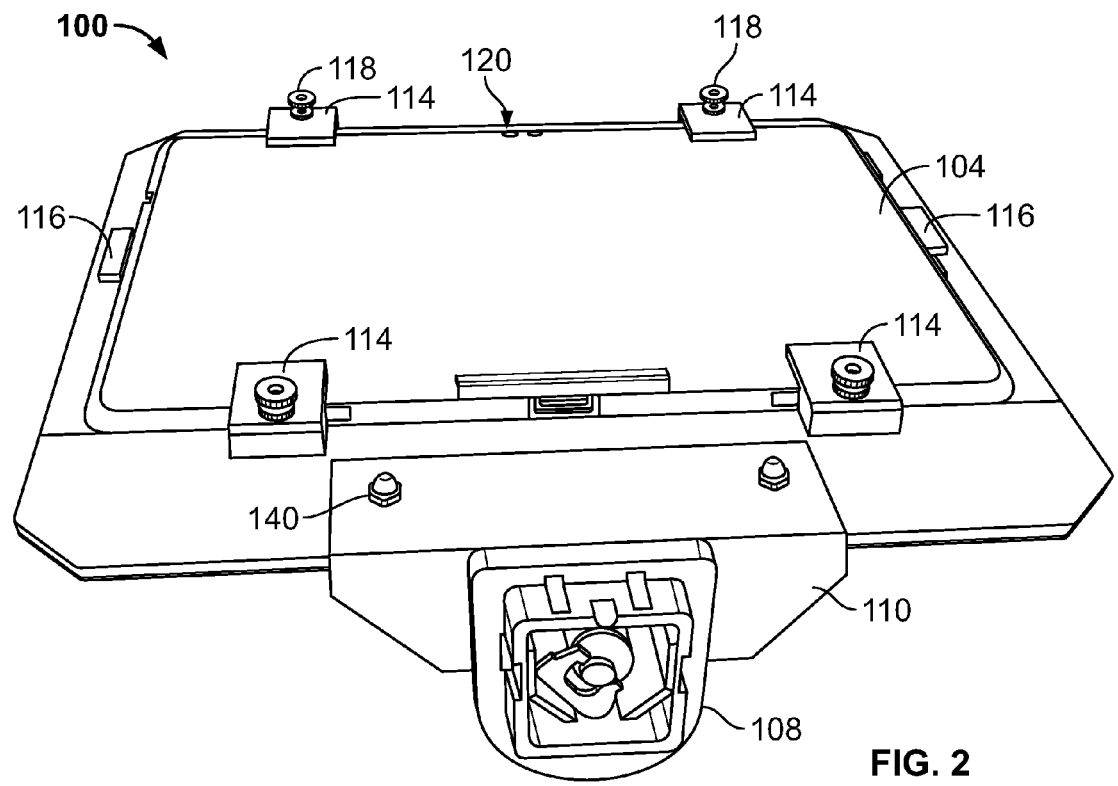
FIG. 2 is an illustration of the rear view of the mounting apparatus of FIG. 1 with a tablet coupled therein in accordance with one or more embodiments of the present invention.

FIGS. 1 and 2 are illustrations of the frontal and rear views of a mounting apparatus with a tablet coupled therein in accordance with one or more embodiments of the present invention. The device 100 enables a user to attach an electronic tablet or a similar device, e.g. electronic mobile devices that lack an attachment point, to a tripod or other portable stand suitable for stabilizing a tablet or similar device for a particular task, e.g. photography, videography.

As illustrated, surface 102 is the front of a tablet computer 104 coupled to the rear of the apparatus of the present invention. Device 100 is configured such that a tablet computer or similar device can be removably fixed in place at the rear (or back) panel of the mounting apparatus as shown in FIG. 2. When tablet computer 104 is secured onto the mounting apparatus, the front face of the tablet computer abuts the back panel of the frame and the clamps 114 act to sandwich the tablet to the frame, and the main (e.g. rear) camera 120 (and accessories) of the tablet is exposed at the rear of the apparatus and all the controls for the tablet, including front camera, are preferably available through the front face 102. A plurality of clamps (or hinges) 114 is provided to sandwich the tablet to the rear of the apparatus in a fixed and secure manner. In a preferred embodiment, the device 100 is configured such that the interfaces, e.g. power, USB, etc., to the tablet 104 are not obscured by the structure of the mounting apparatus.

A detailed description of the specific structure of the mounting apparatus in accordance with an embodiment of the present invention will be described using the illustrations of FIGS. 3 to 7.

Figure 3:
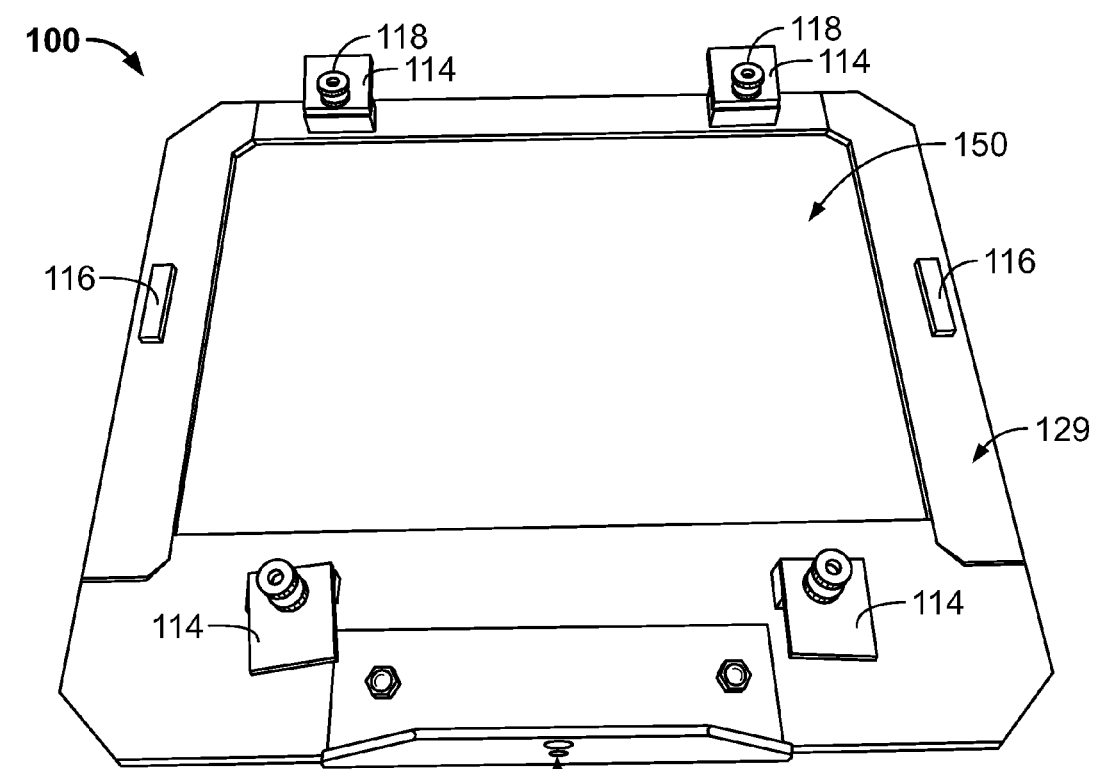
FIGS. 3 and 4 are illustrations of the rear perspective view of the mounting apparatus in accordance with one or more embodiments of the present invention.
Figure 4:
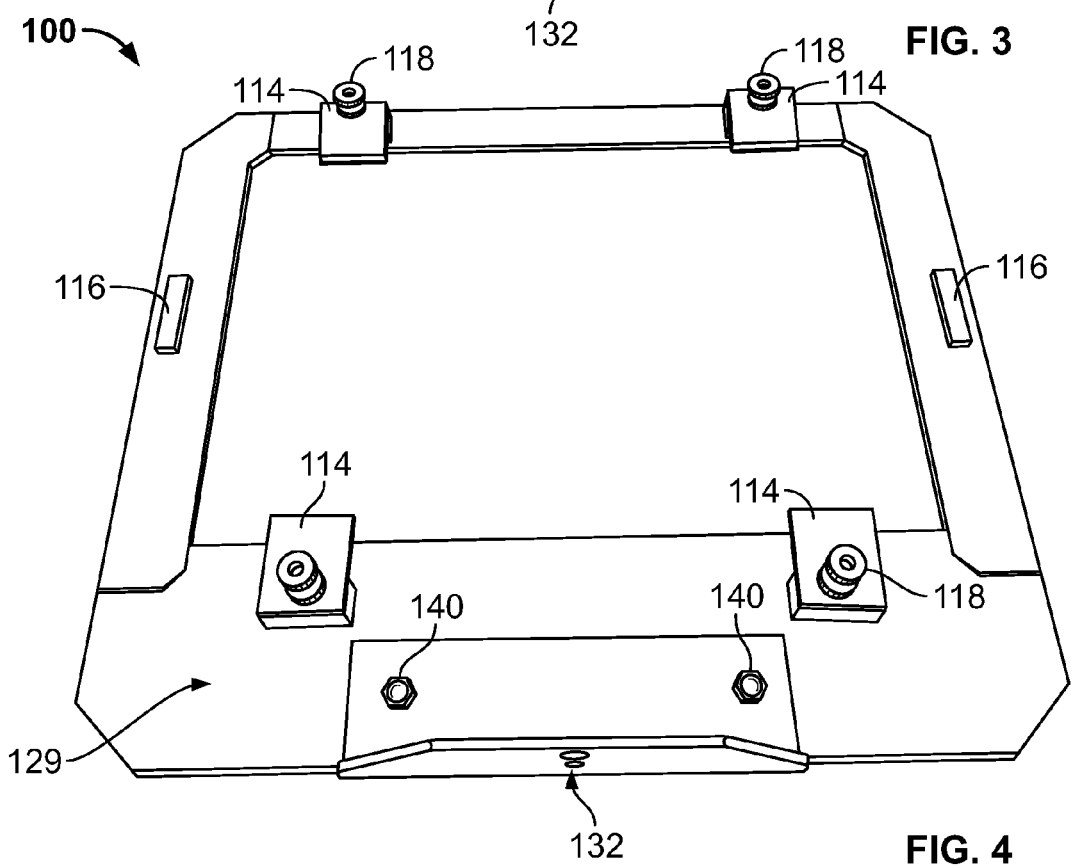
Figure 5:
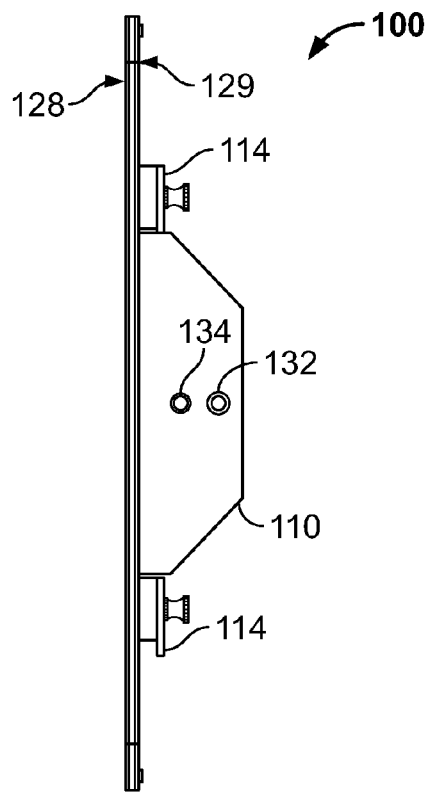
FIG. 5 is an illustration of the bottom view of the mounting apparatus in accordance with one or more embodiments of the present invention.
Figure 6:
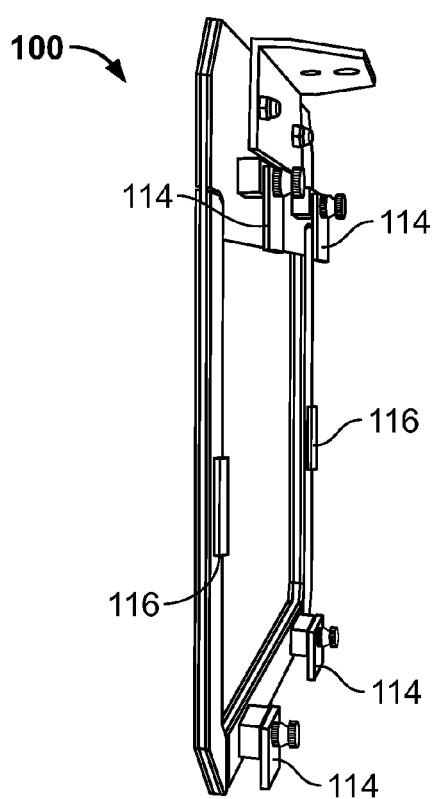
FIG. 6 is an illustration of the side perspective view of the rear of the mounting apparatus in accordance with one or more embodiments of the present invention.
Figure 7:
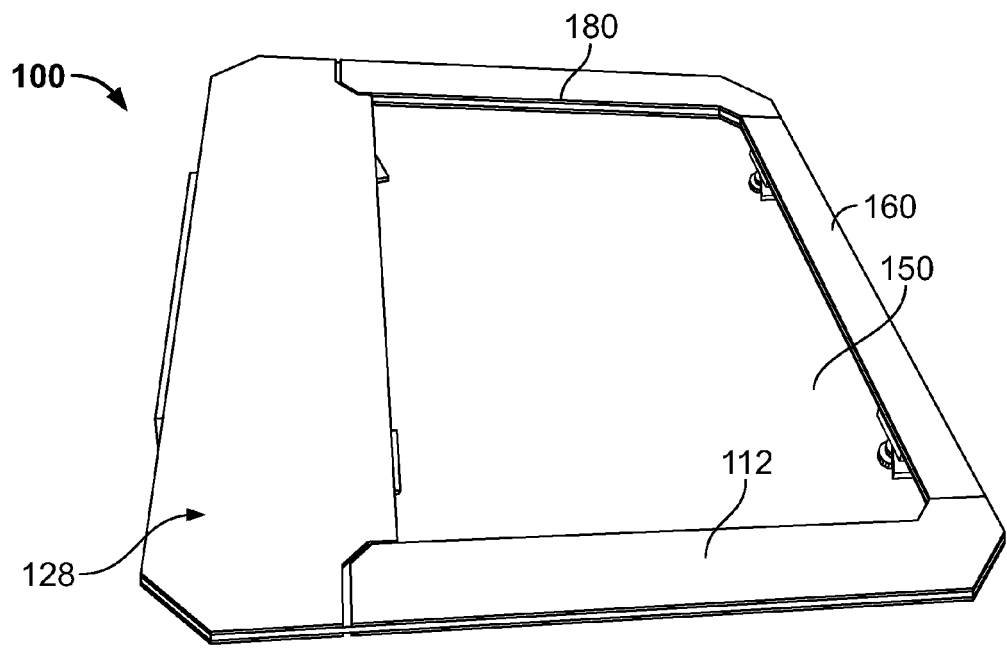
FIG. 7 is an illustration of the front perspective view of the mounting apparatus in accordance with one or more embodiments of the present invention.

FIG. 3 illustrates a rear perspective view of an embodiment of the mounting apparatus of the present invention with clamps 114 in the open position while FIG. 4 illustrates the same rear perspective view of FIG. 3 with clamps 114 in the engagement position. As illustrated, the electronic tablet mounting apparatus 100 comprises a frame 112. Frame 112 is substantially a rectangular planar frame with a substantially rectangular outer perimeter 160 and a substantially rectangular inner perimeter 180 defining the borders of the planar frame. Inner perimeter 160 defines the borders of window 150 and is preferably configured to fit the display area of a tablet computer. The front panel of the frame may include protective devices, e.g. screen protectors, as part of window 150 for the display screen of the tablet computer.

The edges of the outer and inner perimeters may be trimmed or configured for aesthetic reasons. For instance, the edges may be rounded, chopped, etc. Frame 112 may be made from a single piece material or from multiple pieces that are coupled together. Frame 112 could also be formed from materials such as wood, metal, plastic, vinyl, fiberglass, carbon fiber, or any other structurally suitable material. Frame 112 may be configured to be adjustable to fit different size tablet computers or may be configured for specific tablet computers, for example.

Frame 112 further comprises a front panel 128 and a rear panel 129. The rear panel 129 preferably comprises material that would not cause scratching or damage to the face of a tablet computer 104 when it is fixedly attached thereon.

In one or more embodiments, a plurality of side supports 116 is located at the left and right edges of the rear panel 129 of frame 112. The side supports functionally prevent a tablet computer 104 coupled to the frame from slipping in either direction. Side support 116 could be made of any material that would preferably not scratch the sides of the tablet computer 104. For instance, side support could be made from rubber, foam, etc. In the disclosed embodiment, one side support 116 is located on the left side of the rear panel of frame 112 and a second side support 116 is located on the right side of the rear panel of frame 112.

Device 100 further comprises a mounting bracket 110 coupled to the bottom edge of device 100 and configured to couple to a tripod head 108. In one or more embodiments, tripod head 108 is the part of the tripod that attaches to a camera and allows it to be aimed. It may be integrated into the tripod, or as a separate part as illustrated in FIGS. 1 and 2. Those of skill in the art would appreciate that the configuration of the tripod head is irrelevant so long as it is capable of being coupled (removably or fixed) to bracket 108. Tripod head 108 could be any one of different types, e.g. ball head, pan-tilt head, gimbal head, fluid head, gear head, alt-azimuth head, equatorial head, etc. Mounting bracket 110 may also be configured to mount the apparatus of the present invention to any portable stand suitable for stabilizing a tablet or similar device for a particular task, e.g. photography.

Mounting bracket 110 may be coupled to a lower end of the rear side of frame 112, as illustrated. In a preferred embodiment, mounting bracket 110 is L-shaped and configured to couple with frame 112 such that the bottom portion of the L-shape is either directed towards the front of frame 112 (FIGS. 1 and 2) or towards the rear of frame 112 (as shown in FIGS. 3 to 7. Mounting bracket 110 further includes at least one orifice, e.g. 132 and 134, near its geometric center (e.g. from left to right) at its bottom section configured to removably attach to a tripod head. For instance, orifice 132 may comprise a screw thread, e.g. a female threaded receptacle, configured to accept the mounting head thumbscrew of a tripod and hole 134 may be configured as a guide to hold frame 112 in the proper mounting axis. Also, orifice 132 may be configured without threads but setup such that a nut 130 (FIG. 1) may be used to secure the tripod head to the mounting bracket. Mounting bracket 110 may, for instance, be coupled to frame 112 with coupling screws (e.g. nuts and bolts) 140 or could be fixedly coupled using any other preferred method, e.g. bonding, welding, glue, etc.

In some embodiments for example, the at least one orifice on the mounting bracket 110 comprises a tripod lock hole 132 and a reference hole 134. The tripod lock hole 132 on the mounting plate 110 is threaded to allow coupling of the mounting plate 110 to the portable stand. The threaded opening may have a ¼"-20 Unified Thread Standard ("UNC") thread, ⅜"-16 UNC thread, or any other thread shape and size in accordance with a tripod screw standard.

Mounting apparatus 100 further comprises a plurality of clamps 114 located along the perimeter of rear panel 129. Each clamp 114 may be configured with adjusting screw 118. Adjusting screw 118 is configured to be movable from either a locked position or an unlocked position. Adjusting screw 118 may be a threaded screw type device or any appropriate latch type device capable of placing clamps 114 in either a locked position or an unlocked position. In the unlocked position, clamps 114 are freely movable in any direction. For instance, with screw 118 in the unlocked position, clamps 114 may be moved away from window 150 (as shown in FIG. 3) to allow for easy placement and removal of the tablet computer 104.

However, with screw 118 in the locked position, clamps 114 are preferably directed towards window 150 (see FIGS. 2 and 4) and in place to fixedly secure tablet computer 104 to the rear panel of mounting apparatus 100. Those of skill in the art would appreciate that the configuration of the clamps is not limited to that disclosed herein so long as the basic function of sandwiching the tablet computer to the frame in a removably secure position is achieved.

An electronic tablet computer 104 may be removably placed on the back panel 129 with its edges on the frame 112 and secured with clamps 114. When the tablet computer 104 is mounted on frame 112, the front face of the tablet computer abuts the back panel 129 of the frame and the clamps (e.g. 114) act to sandwich the tablet to the frame. The electronic tablet may be a tablet computer, mobile phone, or any such mobile device with an integrated digital camera. Frame 112 is preferably configured or configurable to fit the footprint of a target tablet computer.

In one or more embodiments in accordance with the mounting apparatus 100 described herein, the mounting bracket 110 is configured to removably couple to a portable stand. The portable stand may be an industry standard tripod or any other such existing device with an attachment head. The portable stand is any device that is suitable for stabilizing a tablet or similar device for a particular task, e.g. photography, videography, etc.

While the invention herein disclosed has been described by means of specific embodiments and applications thereof, numerous modifications and variations could be made thereto by those skilled in the art without departing from the scope of the invention set forth in the claims.

What is claimed is:

1. An electronic tablet holder for use on a tripod stand comprising:
   a substantially rectangular frame having a front panel, a back panel and a substantially rectangular inner opening with a perimeter sufficient to provide full access to all functional controls and display on a front-side of a tablet computer through said opening, wherein said frame is configured for mounting said tablet computer with said front-side of said tablet computer abutting said back panel, wherein said back panel comprises protective material for said front-side of said tablet computer when said tablet computer is mounted on said back panel;
   a first support element coupled to a left end of said back panel;
   a second support element coupled to a right end of said back panel, wherein said first support element and said second support element are configured to prevent said tablet computer from sliding sideways;
   a plurality of clamps coupled to a topside and a bottom-side of said back panel and configured to removably engage a backside of said tablet computer and to securely hold said tablet computer in place on said back panel without obscuring functional elements on said backside of said tablet computer; and
   a mounting bracket configured as an L-shaped flange fixedly coupled to said bottom-side of said frame, wherein said mounting bracket is removably coupleable to a tripod head.

2. The electronic tablet holder of claim 1, wherein said mounting bracket comprises a threaded opening configured for coupling with said tripod head, wherein said tripod head is industry standard.

3. The electronic tablet holder of claim 1, wherein said mounting bracket comprises a threaded opening and a guide opening configured for coupling with said tripod head, wherein said tripod head is industry standard.

4. The electronic tablet holder of claim 1, wherein said first support and said second support are made of a second protective material for the sides of the tablet computer.

5. The electronic tablet holder of claim 1, wherein said functional controls on said front-side of said tablet computer comprises a front camera.

6. The electronic tablet holder of claim 1, wherein said functional controls on said front-side of said tablet computer comprises one or more buttons for control of said tablet computer.

7. The electronic tablet holder of claim 1, wherein said functional elements on said backside of said tablet computer comprises a rear camera and a flash.

8. An electronic tablet holder for use on a tripod stand comprising:
   a frame having a front panel, a back panel and an inner opening with a perimeter sufficient to provide full access to all functional controls and display on a front-side of a tablet computer through said opening, wherein said frame is configured for mounting said tablet computer with said front-side of said tablet computer abutting said back panel;
   a first support element coupled to a left end of said back panel;
   a second support element coupled to a right end of said back panel, wherein said first support element and said second support element are configured to prevent said tablet computer from sliding sideways;
   a plurality of clamps coupled to a topside and a bottom-side of said back panel and configured to removably engage a backside of said tablet computer and to securely hold said tablet computer in place on said back panel without obscuring functional elements on said backside of said tablet computer; and
   a mounting bracket configured as an L-shaped flange fixedly coupled to said bottom-side of said frame, wherein said mounting bracket is removably coupleable to a tripod head.

9. The electronic tablet holder of claim 8, wherein said mounting bracket comprises a threaded opening configured for coupling with said tripod head, wherein said tripod head is industry standard.

10. The electronic tablet holder of claim 8, wherein said mounting bracket comprises a threaded opening and a guide opening configured for coupling with said tripod head, wherein said tripod head is industry standard.

11. The electronic tablet holder of claim 8, wherein said first support and said second support are made of a second protective material for the sides of the tablet computer.

12. The electronic tablet holder of claim 8, wherein said functional controls on said front-side of said tablet computer comprises a front camera.

13. The electronic tablet holder of claim 8, wherein said functional controls on said front-side of said tablet computer comprises one or more buttons for control of said tablet computer.

14. The electronic tablet holder of claim 8, wherein said functional elements on said backside of said tablet computer comprises a rear camera and a flash.

15. An electronic tablet holder for use on a tripod stand comprising:
   a substantially rectangular frame having a front panel, a back panel and an inner opening with a perimeter sufficient to provide full access to all functional controls and display on a front-side of a tablet computer through said opening, wherein said frame is configured for mounting said tablet computer with said front-side of said tablet computer abutting said back panel;
   a plurality of clamps coupled to a topside and a bottom-side of said back panel and configured to removably engage a backside of said tablet computer and to securely hold said tablet computer in place on said back panel without obscuring functional elements on said backside of said tablet computer; and
   a mounting bracket configured as an L-shaped flange fixedly coupled to said bottom-side of said frame, wherein said mounting bracket is removably coupleable to a portable stand that is suitable for stabilizing an object for a particular task.

16. The electronic tablet holder of claim 15, wherein said particular task is photography and said object is said tablet computer.

17. The electronic tablet holder of claim 15, wherein said particular task is videography and said object is said tablet computer.

18. The electronic tablet holder of claim 15, wherein said functional controls on said front-side of said tablet computer comprises a front camera.

19. The electronic tablet holder of claim 15, wherein said functional controls on said front-side of said tablet computer comprises one or more buttons for control of said tablet computer.

20. The electronic tablet holder of claim 15, wherein said functional elements on said backside of said tablet computer comprises a rear camera and a flash.

\* \* \* \* \*